March 15, 1966
G. BLOOM ETAL
MASS FLOWMETER
3,240,061
Filed Feb. 4, 1963
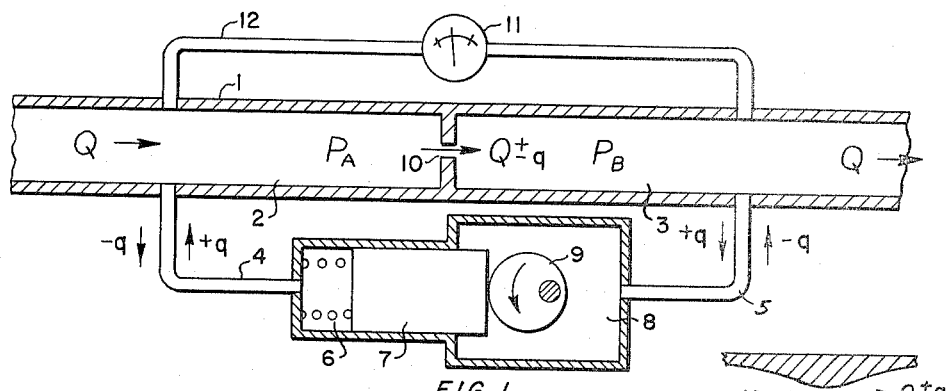
FIG. 1.
FIG. 5.
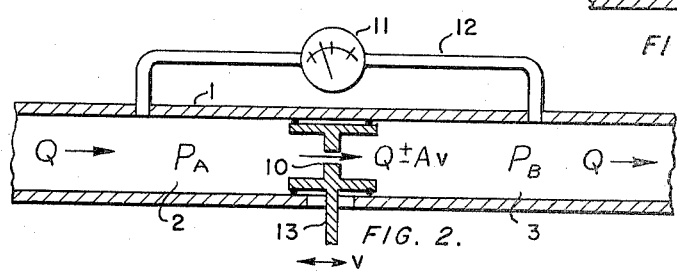
FIG. 2.
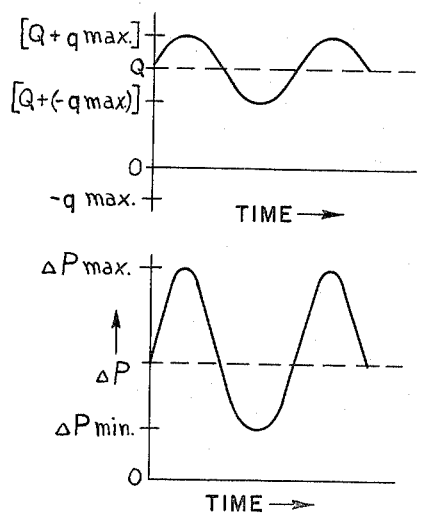
FIG. 3.
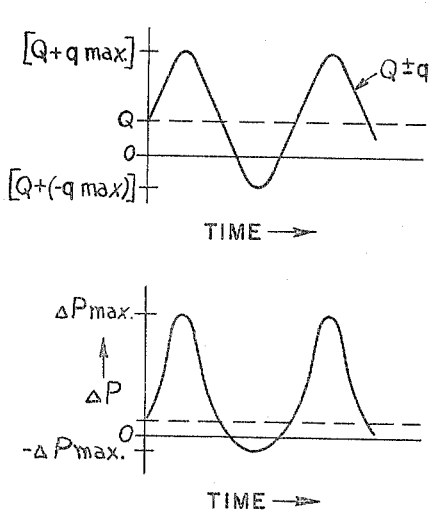
FIG. 4.
INVENTORS
BERNARD FISHMAN
GERALD BLOOM

United States Patent Office 3,240,061
Patented Mar. 15, 1966

3,240,061
MASS FLOWMETER
Gerald Bloom, Spring Valley, and Bernard Fishman, New York, N.Y., assignors, by mesne assignments, to Flo-tron Inc., a corporation of New Jersey
Filed Feb. 4, 1963, Ser. No. 255,775
7 Claims. (Cl. 73—211)

This invention relates to apparatus adapted to measure rate of flow of liquids and more particularly relates to flowmeters adapted to measure mass flow rate in a linear manner.

Flowmeters adapted to measure the rate of flow through a conduit can usually be classified into one of three types; namely, volumetric, differential pressure and mass-rate.

In the volumetric flow meter, the flow of fluid causes a propeller or turbine to revolve with an angular velocity proportional to the volume of fluid passing through it. In other embodiments, the flow causes rotation of a nutating disc, rotation of an oscillating piston, or reciprocation of plungers. Such volumetric flowmeters require a converter to give actual flow rate. In order to read out mass flow rate, it is necessary that a signal proportional to the density of the fluid be combined with the flowmeter readup.

Differential pressure flowmeters measure flow rate by sensing the differential pressure across an orifice or in a venturi, flow nozzle, Pitot tube, or other such device. The velocity head or kinetic energy due to the fluid velocity is measured in this kind of meter. Since there is a known relationship between velocity head and fluid velocity for each specific meter, the fluid velocity can be determined by the following formula:

$$V = C\sqrt{2g\Delta P} = C\sqrt{\frac{2\Delta P}{\rho}}$$

Where:
$V$ = Velocity of fluid
$C$ = Metering element coefficient
$g$ = Gravity constant
$\Delta P$ = Differential pressure
$S$ = Specific weight of fluid
$\rho$ = Density of fluid = $s/g$ Mass flow rate is equal to:

$$M = \rho A V = CA\sqrt{2\rho\Delta P}$$

Where:
$M$ = Mass flow rate
$A$ = Flow area of the metering element cross section Therefore, using known differential pressure flowmeters to obtain mass flow rate measurements also requires measurement of density and extraction of the square root of the read out. Further, the differential pressure output signal by itself has a non-linear relationship to the flow rate and cannot be related to either the mass or volumetric flow rate except by including a fluid density factor.

There are two basic types of mass rate flowmeters; namely, angular momentum and recirculating type meters. In the former, angular momentum is imparted to the flowing fluids, usually by means of a constant speed driving motor and the read-out signal is obtained from the torque generated. This type of mass rate flow meter is expensive and tends to require a great deal of maintenance.

In the recirculation type of mass rate flowmeter, recirculation pumps or other such devices are used to obtain a recirculation of a constant volumetric flow in the meter. The meter is essentially a differential pressure type meter in which a constant volumetric flow is added to or subtracted from the fluid flow being measured. The subject invention is an improved flowmeter of this type.

The present invention is based upon the same principle as embodied in U.S. Patent No. 3,015,233 but has features which permit simplification, size reduction and which give substantial improvement over this patented device.

It is an object of this invention to provide a flowmeter which uses a single differential pressure indicator or transducer to obtain a linear indication of mass flow rate of fluids having different densities.

It is another object of this invention to provide such a flowmeter which uses a single differential pressure across a single flow restrictor.

It is another object of this invention to provide such a flowmeter which uses a single differential pressure across a single oscillating flow restrictor.

It is another object of this invention to provide such a flowmeter which is inexpensive, simply constructed and requires a minimum of maintenance.

Other objects and a fuller understanding of the invention may be had by referring to the following description and claims taken in conjunction with the accompanying drawings in which:

FIGURE 1 is a schematic drawing of a flowmeter with a single flow restrictor and a single differential pressure indicator or transducer;

FIGURE 2 is a schematic drawing of a flowmeter with an ocillating flow restrictor and a single differential pressure indicator or transducer;

FIGURE 3 is a graph illustrating the effect of oscillation on flow and pressure drop; and FIGURE 4 is another graph illustrating the effect of oscillation on flow and pressured drop.

FIGURE 5 is a schematic drawing of the flowmeter of FIG. 1 depicting a Venturi restrictor.

FIGURE 1 shows a schematic drawing of a conduit 1 through which variable input and output volumetric flow "Q" is directed. The conduit 1 has two sections 2 and 3 spaced therealong and each of these sections is bridged by branch conduits 4 and 5 respectively which have a reciprocating plunger 7 disposed intermediate the ends thereof. Reciprocating plunger 7 operates by means of cam 9 and spring 6.

This reciprocating plunger 7 alternately adds flow to and substracts flow from the flow in conduit 1. As plunger 7 is forced to the left against spring 6 by eccentric 9, a flow "$+q$" is generated in conduit 4 and a like flow "$+q$" is generated into chamber 8. In this mode of operation the flow through flow restrictor 10 is the summation of flows, "$Q+q$." As eccentric 9 continues to rotate, plunger 7 changes direction of motion and is forced to the right by spring 6. The flow in conduit 4 and the flow into chamber 8 also change direction, so that the flows in each can be expressed in "$-q$" in this mode of operation, and the flow through restrictor 10 then becomes the difference in flows, "$Q-q$."

It has been found that by connecting a meter through line 12 adapted to measure the differential pressure between these sections 2 and 3, such as a differential pressure transducer 11, a reading can be obtained which linearly closely approximates the mass flow rate through the conduit 1.

The flow through an orifice can be described mathematically by the equation:

(1) $$\Delta P = \frac{\rho Q^2}{2C^2 A^2}$$

With a constant recirculating flow of $q$, the difference in pressure drops across two orifices can be described as follows:

$$(2) \quad \Delta P_1 - \Delta P_2 = \frac{\rho}{C^2 A^2}[(Q+q)^2 - (Q-q)^2]$$

which reduces to $$(3) \quad \Delta P_1 - \Delta P_2 = \frac{2q}{C^2 A^2}(\rho Q) = KM$$

where $\Delta P$ = Pressure drop across each flow restrictor
$\rho$ = Fluid density
$c$ = Flow coefficient
$A$ = Flow restrictor area
$q$ = Recirculating flow rate (volumetric)
$Q$ = Process flow rate (volumetric)

$$K = \frac{2q}{C^2 A^2} \text{ (a constant)}$$

$M = \rho Q$ (mass flow rate)

In the embodiment shown in FIGURE 1, a single flow restrictor 10 is used with reciprocating plunger 7. Reciprocating plunger 7 alternately adds flow to and substracts flow from the process flow. Thus, the pressure drop across the flow restrictor 10 varies in such a way that:

$$(4) \quad \Delta Pi = \frac{\rho}{2C^2 A^2}(Q + qi)^2$$

where $\Delta Pi$ = Instantaneous value of pressure differential
$qi$ = Instantaneous value of recirculating flow If the pressure differential is measured where $qi = q$ and again where $qi = -q$ and the second value of $\Delta P$ is substracted from the first, the result will be:

$$(5) \quad \Delta P^1 - \Delta P^2 = \frac{\rho}{2C^2 A^2}[(Q+q)^2 - (Q-q)^2] = KM$$

In FIGURE 2, the same principle is used with the alternative arrangement, consisting of a flow restrictor 10 with a means for oscillating said flow restrictor 10 through connection 13 so there is a component of the oscillating motion which is axial with conduit 1. In this embodiment if the flow restrictor 10 has an instantaneous axial displacement rate $Vi$ and since $ViA = qi$, then the instaneous flow rate $Qi$ through the flow restrictor 10 will be as follows:

$$(6) \quad Qi = Q \pm qi$$

As in the arrangement shown in FIGURE 1, when $qi = q$ and $qi = -q$ the result will be:

$$(7) \quad \Delta P_1 - \Delta P_2 = \frac{\rho}{2C^2 A^2}[(Q+q)^2 - (Q-q)^2] = KM$$

In either arrangement shown in FIGURES 1 and 2, the pressure differentials may be measured at any points where $qi = q$ and $-q$. Normally, however, the most convenient values are those in which $q$ and $-q$ are maximum, or peak values.

This can then be sensed and indicated by one of several "peak-to-peak" measuring devices, as for example, a strain gauge type of pressure transducer together with a vacuum tube voltmeter.

FIGURE 5 depicts a Venturi restrictor which may be substituted for the restrictor 10 in FIG. 1.

In FIGURES 3 and 4, there are shown pictorial representations of the way in which flow rate and pressure drop through the flow restrictor vary with time for the case in which $qi = q$ max. and $-q$ max. are smaller than process flow rate $Q$, and the case where they are larger than $Q$, respectively.

In FIGURE 3, the flow through the flow restrictor is always in the same direction, so the pressure differential is always greater than zero. The mass flow rate is proportional to the difference between maximum and minimum pressure differentials, assuming a "peak-to-peak" measurement. In FIGURE 4, the flow through the flow restrictor constantly changes direction resulting in a pressure differential which periodically changes from positive to negative. In this case mass flow rate is proportional to the difference between maximum positive and maximum negative pressure differentials, assuming "peak-to-peak" measurement.

Although we have described our invention with a certain degree of particularity, it is understood that the present disclosure has been made only by way of example and that numerous changes in the details of construction and the combination and arrangemnt of parts may be resorted to without departing from the spirit and scope of the invention as hereinafter claimed.

We claim:

1. A mass flowmeter for measuring the mass flow rate of fluid passing therethrough at a volumetric flow rate, comprising a conduit having a flow restrictor, means for adding a supplemental volumetric flow rate of fluid to said volumetric flow rate passing through said flow restrictor, means for removing said supplemental volumetric flow rate of fluid from said volumetric flow rate passing through said flow restrictor, means for measuring the maximum pressure difference occurring across said flow restrictor during the addition of said supplemental volumetric flow rate to derive a first signal and means for measuring the maximum pressure difference occurring across said restrictor during the removal of said supplemental volumetric flow rate to derive a second signal, and means for algebraically combining said first and second signals.

2. The mass flowmeter of claim 1 wherein the flow restrictor is an orifice.

3. The mass flowmeter of claim 1 wherein the flow restrictor is a venturi.

4. A mass flowmeter adapted to measure the mass flow rate M of fluid passing therethrough at a volumetric flow rate Q comprising, a conduit having a flow restrictor with cross-sectional area smaller than the cross-sectional area of said conduit, means for alternately adding to and subtracting from said volumetric flow rate Q of fluid passing through said restrictor a supplemental volumetric flow rate $q$ of fluid, and means for obtaining a signal which changes linearly with a change in the mass flow rate M comprising means for differentially measuring the peak amplitudes of pressure developed on both sides of said flow restrictor resulting from the alternate adding and substracting of said supplemental volumetric flow rate $q$ of fluid.

5. A mass flowmeter adapted to measure the mass flow rate of fluid passing therethrough comprising:
a conduit having a flow restrictor with cross-sectional area smaller than the cross-sectional area of said conduit, reciprocating piston means for periodically increasing and decreasing the volumetric flow rate through the said flow restrictor by the same peak amount of volumetric flow rate, and
means for obtaining a signal which changes linearly with a change in said mass flow rate comprising means for measuring the peak to peak pressure differential across said flow restrictor during a given cycle of said increasing and decreasing.

6. The mass flowmeter of claim 5 wherein the means for measuring the pressure differential is a differential pressure transducer.

7. The mass flowmeter of claim 1 including a meter connected to said differential pressure transducer adapted to multiply the transducer reading by a constant and read out the resultant multiple.

(References on following page)

References Cited by the Examiner

UNITED STATES PATENTS

| | | | |
|---|---|---|---|
| 790,888 | 5/1905 | Ferris | 73—213 X |
| 2,570,410 | 10/1951 | Vetter | 73—205 X |
| 2,660,886 | 12/1953 | Milmore | 73—194 X |
| 3,015,233 | 1/1962 | Ryder et al. | 73—205 |
| 3,102,923 | 9/1963 | Prindle | 73—194 |

FOREIGN PATENTS

| | | |
|---|---|---|
| 710,593 | 9/1941 | Germany. |
| 856,204 | 12/1960 | Great Britain. |

RICHARD C. QUEISSER, *Primary Examiner.*

DAVID SCHONBERG, *Examiner.*